(12) United States Patent
Nanni

(10) Patent No.: US 6,509,575 B1
(45) Date of Patent: Jan. 21, 2003

(54) METHOD AND APPARATUS FOR POLARIZATION FILTERED X-RAY FILM SCANNING RECORDING

(75) Inventor: Richard A. Nanni, Benzonin, MI (US)

(73) Assignee: Impact Imaging, Inc., Columbia, MA (US)

(*) Notice: Subject to any disclaimer, the term of this patent is extended or adjusted under 35 U.S.C. 154(b) by 0 days.

(21) Appl. No.: 09/565,499

(22) Filed: May 5, 2000

Related U.S. Application Data

(60) Provisional application No. 60/133,124, filed on May 7, 1995.

(51) Int. Cl.[7] ............................................. G01N 21/00
(52) U.S. Cl. ...................... 250/559.05; 250/559.02; 250/559.07; 356/443
(58) Field of Search ................. 250/559.02, 559.05, 250/559.06, 559.07, 559.09, 559.11, 559.16, 234, 225, 226; 356/443, 444; 348/99, 100, 108, 110

(56) References Cited

U.S. PATENT DOCUMENTS

| | | |
|---|---|---|
| 3,610,729 A | 10/1971 | Rogers |
| 4,278,736 A | 7/1981 | Kamerling |
| 4,896,218 A | 1/1990 | Vick |
| 5,091,652 A * | 2/1992 | Mathies et al. .......... 250/458.1 |
| 5,172,419 A | 12/1992 | Manian |
| 5,235,183 A | 8/1993 | Whiting et al. |
| 5,517,307 A | 5/1996 | Buehring et al. |
| 5,530,260 A | 6/1996 | Arakawa |
| 5,753,930 A | 5/1998 | Dutton |
| 5,900,985 A | 5/1999 | Ho et al. |
| 5,955,030 A * | 9/1999 | Pettit ........................ 422/82.08 |

* cited by examiner

Primary Examiner—Kevin Pyo
(74) Attorney, Agent, or Firm—McGuireWoods LLP

(57) ABSTRACT

An imaging recording method and an apparatus for its implementation, including applying a light to an image to produce imaged light, passing the imaged light through a filter unit to provide filtered light, and recording the filtered light on an optical detector to produce a recorded image. The filter unit includes a first filter and a second filter. The first filter is polarization selective and the second filter is wavelength selective.

45 Claims, 4 Drawing Sheets

METHOD AND APPARATUS FOR POLARIZATION FILTERED X-RAY FILM SCANNING RECORDING

CROSS-REFERENCE TO RELATED APPLICATIONS

Priority is claimed from U.S. Provisional Patent Application No. 60/133,124 filed May 7, 1999, which is incorporated herein by reference in its entirety.

FIELD OF THE INVENTION

The invention relates to the scanning and digitization of images, and more specifically, to the scanning and digitization of x-ray images.

BACKGROUND OF THE INVENTION

When x-ray film is produced, a layer of photographic colloid, normally gelatin, containing silver bromide crystals is rolled onto a transparent plastic support. The rolling process, combined with the polarity of the crystals and their granularity, tends to orient the majority of the essentially octahedral crystals in a predetermined pattern or grain in the film. The crystals tend to be birefringent, or doubly refracting.

When passed through a sheet of standard x-ray film, light can become scattered and its polarization rotated due to interaction of the light with the silver bromide crystals in the emulsion. Scanners that digitize x-ray film typically record this light with little to no processing or filtering. The result is that the scanned image is diffused, that is, it is not as sharply defined as the original image. This effect is often referred to as "edge blooming" (i.e., fizziness).

When reflected from a sheet of standard x-ray film, the different polarization components of light can reflect unequally off the sheet. This unequal reflection results in glare from the image, which diminishes the quality of an image recorded from the reflected light.

SUMMARY OF THE INVENTION

It is therefore an object of this invention to provide an improved method and apparatus for recording images.

It is yet a further object of the invention to improve recorded images by minimizing or eliminating edge effects from recorded features.

It is yet a further object of the invention to improve recorded images by minimizing or eliminating glare from the recorded image.

These and other objects are achieved by an imaging recording method including applying a light to an image to produce imaged light, passing the imaged light through a filter unit to provide filtered light, and recording the filtered light on an optical detector to produce a recorded image. The filter unit comprises a first filter that is polarization selective and a second filter that is wavelength selective.

This invention also relates to an imaging recording system including a scanner for applying a light to an image to produce imaged light, a filter unit for filtering the imaged light to provide filtered light, and an optical detector for recording the filtered light to produce a recorded image. The filter unit comprises a first filter that is polarization selective and a second filter that is wavelength selective.

The image can be an opaque, transparent, and/or translucent object, document, and/or photograph. In a preferred embodiment, this image is a films, an more preferably an x-ray films.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

Figure 1:
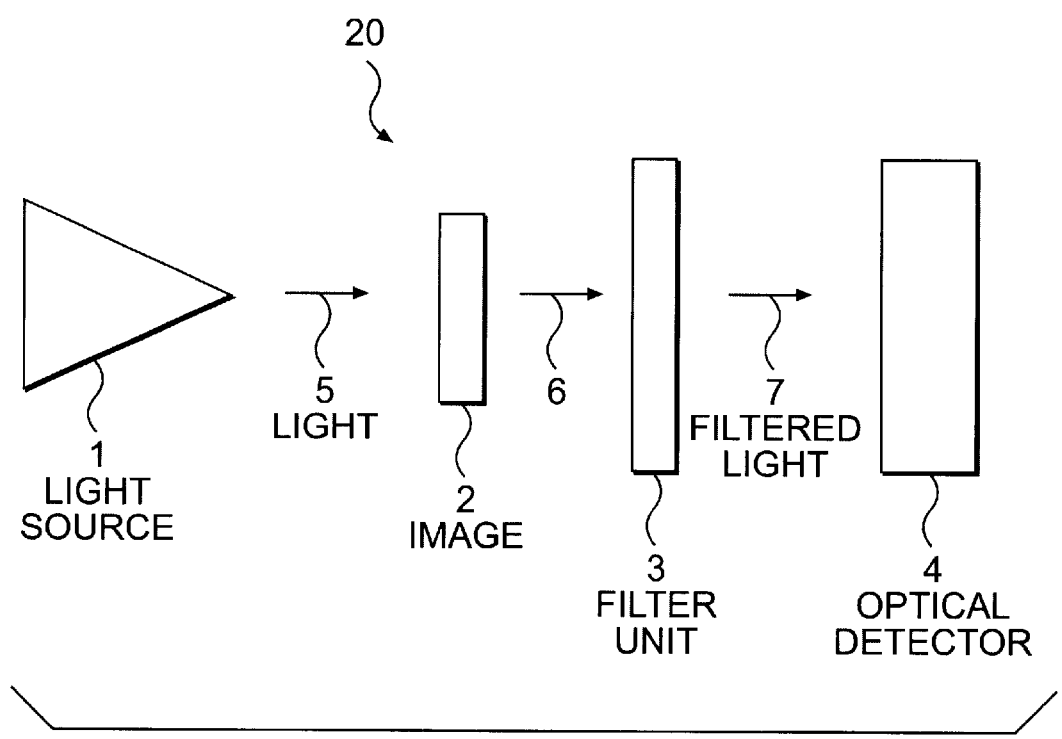
FIG. 1 illustrates a plan view of the invention for a transmission mode image scanner.
Figure 2:
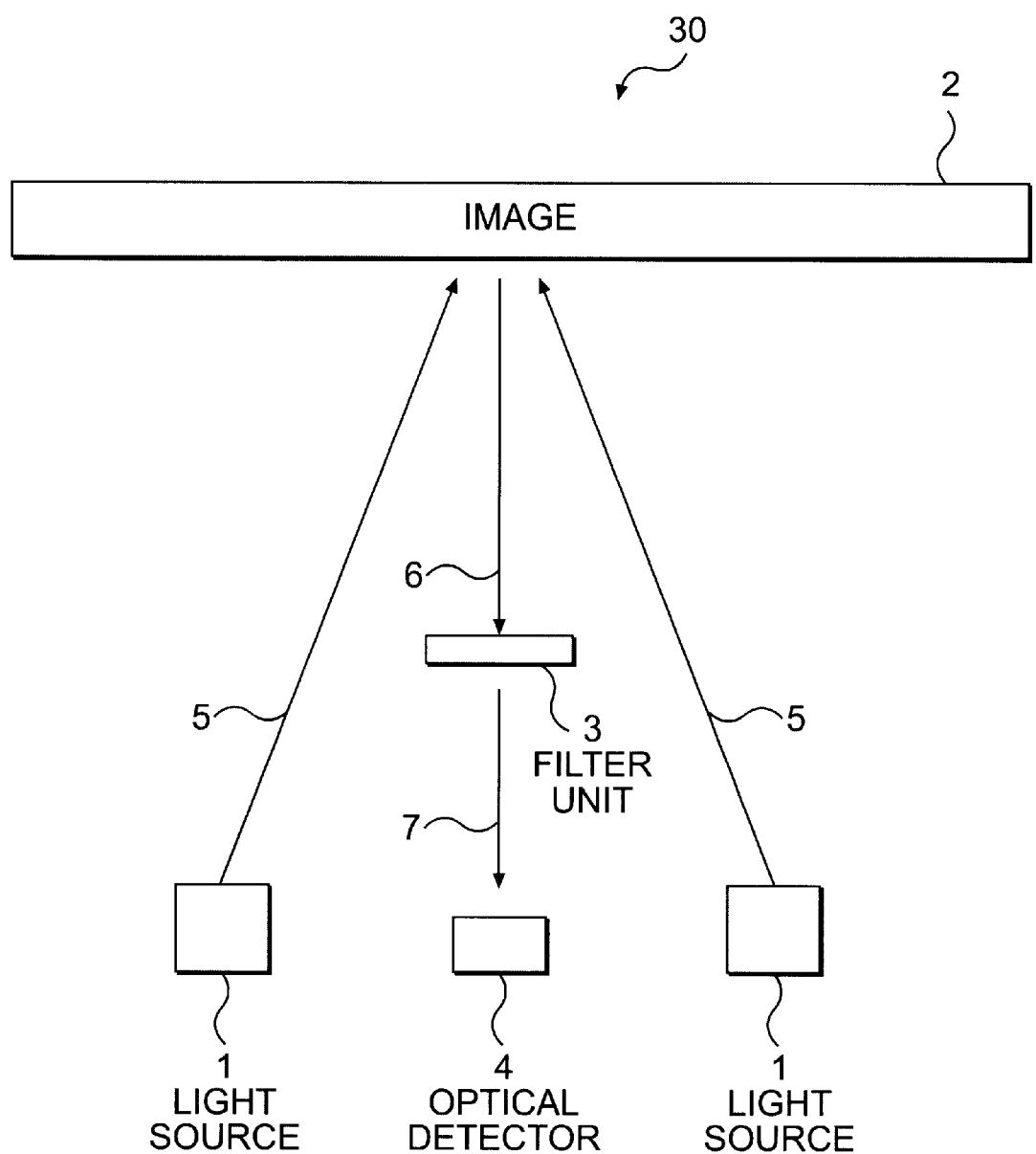
FIG. 2 illustrates a plan view of the invention for a reflection mode image scanner.

FIGS. 1 and 2 illustrate a transmission mode scanner 20 and reflection mode scanner 30, respectively, of the invention. In each case, the scanner 20, 30 uses a light source 1 to generate the light, applies the light to the image 2, and records the light with an optical detector 4 to obtain a recorded image. The light source and the optical detector can be a commercial scanner or any device or combination of devices that, at least, applies the light to the image and records the light to obtain a recorded image. Examples of light sources include lasers, incandescent lamps, fluorescent lamps, and halogen lamps. Examples of optical detectors include charge couples devices, diode arrays, CMOS-based optical detectors, photocells, photodiodes, and photomultiplier tubes.

According to the present invention, a filter unit 3 is placed optically between the image 2 and the optical detector 4. In this way, light 5 from the light source 1 is transmitted through (FIG. 1) or reflected from (FIG. 2) the image 2 to produce imaged light 6. The imaged light 6 interacts with the filter unit 3 to provide filtered light 7. The filtered light 7 is recorded by the optical detector 4.

Figure 3:
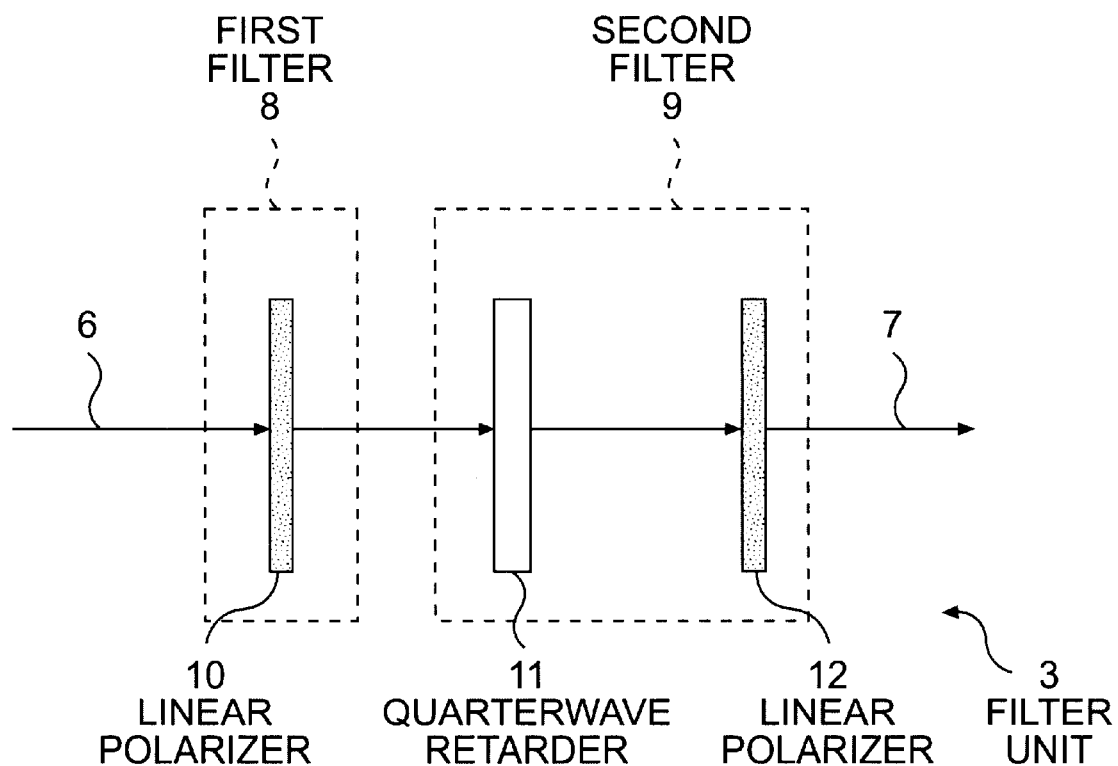
FIG. 3 illustrates a plan view of a filter unit of the invention.

As shown in FIG. 3, the filter unit 3 includes a first filter 8, which is polarization selective, and a second filter 9, which is wavelength selective. The first filter 8 preferably includes a first linear polarizer 10. The second filter 9 preferably includes a quarterwave retarder 11 and a second linear polarizer 12. In a preferred embodiment, these elements are combined as ordered layers. In another embodiment, these elements are combined with other optical elements. The filter unit 3 according the present invention is preferably, though not necessarily, an integral, multilayer unit. In another embodiment, the filter unit 3 is incorporated into or manufactured as an integral part of the optical detector.

The filter unit 3, particularly the first filter 8, filters (1) light scattered by the image, (2) light having polarization components rotated by interaction with the image, and (3) glare or glare light reflected from the image. In a preferred embodiment, the first filter 8 includes a first linear polarizer 10 having an optical axis substantially aligned with the polarization axis of the light used to scan the image 2. The filter unit 3, particularly the first filter 8, filters stray light, including, for example, room light that has leaked into the scanner 20, 30.

The filter unit 3, particularly the second filter 9, selectively passes wavelengths of the light applied to the image. In a preferred embodiment, the second filter 9 selectively transmits the wavelengths of light generated by the light source in order to filter out background light, such as room light that has leaked into the scanner. Accordingly, the second filter 9 may be any useful optical element or combination of optical elements that selectively transmit certain wavelengths. Wavelength filtering is particularly useful where the light source is a laser, since a narrow bandpass filter may be used to provide very selective optical transmission and rejection.

In another embodiment, the second filter 9 is a color compensating filter. Color compensating filters affect image recording by attenuating principally the red, blue or green part of the optical spectrum. While controlling one color, the filter transmits one or both of the other two colors. Thus, color compensating filters can make changes in the color balance of pictures recorded on color films, or compensate for deficiencies in the spectral quality of a light source.

Preferably, the second filter 9 includes a quarterwave retarder 11 and a linear polarizer 12 combination. The second filter can be implemented with one of the quarterwave retarder and linear polarizer combinations offered by the Polaroid Corporation (Cambridge, Mass.), such as the unit identified as a HNEP37 Circular Polarizer. In another embodiment, the second filter 9 can be a bandpass filter, bandstop filter, dichroic filter, or colored filter. In another embodiment, the second filter 9 can be a tunable optical filter, in which case the wavelengths passed by the second filter 9 can be scanned to different wavelengths in order to achieve optimal image recordation.

In another embodiment, the filter unit 3 reduces the overall intensity of the imaged light so that the optical detector 4 is not saturated and is implemented with a neutral density filter, for example,. Neutral density filters, which may have some slight additional blue absorption, are used in black-and-white and color image recordation applications to reduce light intensity by a definite ratio without affecting the basic tonal rendition in the original scene. Preferably, the neutral density filter is part of the second filter 9. The neutral density filter can also be combined with the first filter 8 or can be an independent optical element in the filter unit 3.

Scanners for scanning images generally operate in either a transmission mode or a reflection mode. A transmission mode scanner according to the present invention is illustrated in FIG. 1. A reflection mode scanner according to the present invention is illustrated in FIG. 2. In transmission mode, the image light from the light source is passed through the image and is directed to an optical detector. In reflection mode, the light from the light source is reflected off the image and is directed to an optical detector. The image recordation method of the invention may be used for either transmission mode or reflection mode. In either case, the filter unit 3 is typically arranged such that it is optically between the image 2 and the optical detector 4. It is an advantage of the present invention that an optical axis of the first filter 8, such as a polarization axis of the first linear polarizer 10, does not need to be aligned with any particular axis of the image 2, such as the crystal orientation axis or grain axis of an x-ray film. Thus, an image such as an x-ray film may be aligned and scanned in any direction.

In the case of transmission mode scanners, as shown in FIG. 1, the light is preferably laser generated light. More preferably, the light is substantially linearly polarized and has a relatively narrow wavelength range. In this case, the first filter 8 preferably includes a linear polarizer 10. The optical axis of the linear polarizer 10 is preferably aligned parallel to the polarization axis of the light 5 from the light source 1.

Without being bound by theory, it is believed that the filter unit 3 provides enhanced image recordation for transmission mode filtering by filtering (1) light scattered by the image and (2) light having polarization components rotated by interaction with the image. For example, in the case of imaging and recording an x-ray film using polarized light in transmission mode (see FIG. 1), when the polarized light 5 from the light source 1 interacts with the x-ray film, a number of phenomenon may occur. As a first phenomenon, the imaging light 5 is transmitted, in whole or in part, through the x-ray film. The transmitted light 6, with a polarization state essentially the same as that of the light emitted by the light source 1, is generally not filtered by the first linear polarizer 10. This is because the optical axis of the first linear polarizer 10 is aligned to the polarization axis of the light 5 emitted from the light source 1. This transmitted light 6 generally passes through the second filter as filtered light 7. Accordingly, the transmitted light 6 with polarization components not perturbed by interaction with the image becomes filtered light 7 and reach the optical detector 4 for recording.

As a second phenomenon, the imaging light 5 may scatter from features, particularly edges, on the x-ray film. This scattering may occur due to the interaction of the imaging light 5 with finite sized grains in the x-ray film. Scattering is most problematic with relatively short wavelength imaging light 5. As a result of scattering, the polarization of transmitted light 6 that has been scattered by the x-ray film may be different than the original polarization state of the light 5 emitted by the light source 1. The polarization state of this scattered, transmitted light 6 is not generally aligned with the optical axis of the linear polarizer 10 of the first filter 8. Accordingly, this scattered light 6 is generally rejected by the linear polarizer 10 and does not become filtered light 7 nor does it reach the optical detector 4 for recording. In this way, artifacts of the imaging process, such as edge blooming due to scattered light, are minimized or eliminated.

As a third phenomenon, the imaging light 5 may interact with the crystalline structure of the x-ray film. This crystalline structure may be optically active (i.e., birefringent) and may, therefore, perturb the imaging light. The polarization state of transmitted light 6 perturbed due to the birefringence of the x-ray film is generally different than the polarization state of the original imaging light S. The polarization state of this perturbed, transmitted light is generally not aligned with the optical axis of the first linear polarizer 10 of the first filter 8. Accordingly, this perturbed, transmitted light 6 is generally rejected by the linear polarizer 10 and does not become filtered light 7 nor does it reach the optical detector 4 for recording In this way, artifacts of the imaging process caused by the optical activity of the x-ray film are minimized or eliminated.

In the case of reflection mode scanners, as shown schematically in FIG. 2, the imaging light 5 is generally incoherent light source generated light and/or broad band light source generated light. The imaging light 5 used in a reflection mode scanner is also typically unpolarized. In this case, the first filter 8 preferably includes a linear polarizer 10. Generally, different polarization states of light reflect unequally from a surface. The light polarized perpendicular to the plane of the reflection reflects more than the light polarized in the plane of the reflection. The distribution of polarization states in the reflected light is also generally dependent on the angle of incidence. Glare off a surface, which diminishes the quality of recorded images, is the result of this phenomenon of unequal reflection.

Preferably, the optical axis of the linear polarizer 10 of the first filter 8 is aligned such that the optical axis is parallel to the plane of the reflected light. The filtered light 7 is essentially the more weakly reflected polarization component of the reflected light 6 since the more strongly reflected polarization component is filtered by the first linear polarizer 10 of the first filter 8 in the filter unit 3. The filtered light 7, which essentially does not include polarization components perpendicular to the plane of reflection from the image, is incident on and recorded by the optical detector 4 and yields a recorded image where the glare is reduced or eliminated.

Figure 4A:
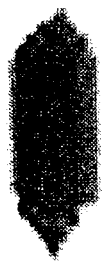
FIGS. 4A and 4B illustrate, respectively, an image feature recorded with and without filtering according to the invention.
Figure 4B:

FIGS. 4A and 4B show an image recorded using a filter according to the present invention as compared to an image recorded using a standard recording method. The image in FIG. 4A is an image of a feature on an x-ray film, which has been filtered using the transmission mode embodiment of the present invention. The image in FIG. 4B is an unfiltered transmission mode image of the same feature and represents the result from a standard image recording process. FIGS. 4A and 4B demonstrate the ability of the method of the invention to substantially sharpen a feature, and particularly the edges of a feature on an x-ray film, by minimizing or eliminating edge effects.

The invention has been described in detail with respect to preferred embodiments. The described embodiments, as well as the examples discussed herein, are non-limiting examples. Changes and modifications may be made without departing from the invention in its broader aspects, and the invention, therefore, as defined in the claims, is intended to cover all such changes and modifications.

What is claimed is:

1. A method for recording images comprising the steps of:
   applying a light to an image to produce imaged light;
   passing the imaged light through a filter unit to provide filtered light, said filter unit comprising a first filter and a second filter, wherein said first filter is polarization selective and said second filter is wavelength selective and wherein an optial axis of said first filter can be aligned in any direction to the image; and
   recording the filtered light on an optical detector to produce a recorded image.

2. The method of claim 1, wherein the filter unit is an integral, multilayer unit.

3. The method of claim 1, wherein the filter unit comprises as ordered layers a first linear polarizer, a quarterwave retarder, and a second linear polarizer.

4. The method of claim 1, wherein the filter unit filters stray light.

5. The method of claim 1, wherein the filter unit comprises a neutral density filter.

6. The method of claim 1, wherein the first filter comprises a linear polarizer.

7. The method of claim 1, wherein the first filter filters light scattered by the image.

8. The method of claim 1, wherein the first filter filters light having polarization components rotated by interaction with the image.

9. The method of claim 1, wherein the first filter filters polarization components of the light preferentially reflected from the image.

10. The method of claim 1, wherein the first filter filters glare from the image.

11. The method of claim 1, wherein the light has a polarization axis, the first filter comprises a linear polarizer having an optical axis, and said optical axis is substantially aligned with said polarization axis.

12. The method of claim 1, wherein the second filter passes wavelengths of the light applied to the image.

13. The method of claim 1, wherein the second filter further comprises a linear polarizer.

14. The method of claim 13, wherein the second filter comprises a quarterwave retarder and a linear polarizer.

15. The method of claim 1, wherein the second filter is selected from the group consisting of a bandpass filter, a bandstop filter, and a dichroic filter.

16. The method of claim 1, wherein the image light is light passed through the image in a transmission mode.

17. The method of claim 1, wherein the image light is light passed over the image in a reflection mode.

18. The method of claim 1, wherein the light is laser generated light.

19. The method of claim 1, wherein the light is incoherent light source generated light.

20. The method of claim 1, wherein the light is broad band light source generated light.

21. The method of claim 1, wherein the image is a film.

22. The method of claim 21, wherein the film is an x-ray film.

23. An imaging recording system comprising:
   a scanner to apply a light to an image to produce imaged light;
   a filter unit to filter the imaged light to provide filtered light, said filter unit comprising a first filter and a second filter, wherein said first filter is polarization selective and said second filter is wavelength selective and wherein an optial axis of said first filter can be aligned in any direction to the image; and
   an optical detector to record the filtered light to produce a recorded image.

24. The system of claim 23, wherein the filter unit is an integral, multilayer unit.

25. The system of claim 23, wherein the filter unit comprises as ordered layers a first linear polarizer, a quarterwave retarder, and a second linear polarizer.

26. The system of claim 23, wherein the filter unit filters stray light.

27. The system of claim 23, wherein the filter unit comprises a neutral density filter.

28. The system of claim 23, wherein the first filter comprises a linear polarizer.

29. The system of claim 23, wherein the first filter filters light scattered by the image.

30. The system of claim 23, wherein the first filter filters light having polarization components rotated by interaction with the image.

31. The system of claim 23, wherein the first filter filters polarization components of the light preferentially reflected from the image.

32. The system of claim 23, wherein the first filter filters glare from the image.

33. The system of claim 23, wherein the light has a polarization axis, the first filter comprises a linear polarizer having an optical axis, and said optical axis is substantially aligned with said polarization axis.

34. The system of claim 23, wherein the second filter passes wavelengths of the light applied to the image.

35. The system of claim 23, wherein the second filter further comprises a linear polarizer.

36. The system of claim 35, wherein the second filter comprises a quarterwave retarder and a linear polarizer.

37. The system of claim 23, wherein the second filter is selected from the group consisting of a bandpass filter, a bandstop filter, and a dichroic filter.

38. The system of claim 23, wherein the image light is light passed through the image in a transmission mode.

39. The system of claim 23, wherein the image light is light passed over the image in a reflection mode.

40. The system of claim 23, wherein the light is laser generated light.

41. The system of claim 23, wherein the light is incoherent light source generated light.

42. The system of claim 23, wherein the light is broad band light source generated light.

43. The system of claim 23, wherein the image is a film.

44. The system of claim 43, wherein the film is an x-ray film.

45. A system for recording images comprising:

means for applying a light to an image to produce imaged light;

means for filtering the imaged light to obtain filtered light, said means for filtering comprising means for first filtering and means for second filtering, wherein said means for first filtering is polarization selective and said means for second filtering is wavelength selective and wherein an optial axis of said first filter can be aligned in any direction to the image; and means for recording the filtered light to produce a recorded image.

* * * * *

UNITED STATES PATENT AND TRADEMARK OFFICE
CERTIFICATE OF CORRECTION

PATENT NO.      : 6,509,575 B1
DATED           : January 21, 2003
INVENTOR(S)     : Richard A. Nanni It is certified that error appears in the above-identified patent and that said Letters Patent is hereby corrected as shown below:

<u>Title page, Item [54] and Column 1, line 3,</u>
Title, change "SCANNING RECORDING" to -- SCANNING AND RECORDING --.

<u>Title page,</u>
Item [73], Assignee, change "Columbia, MA" to -- Columbia, MD --.
Item [60], Related U.S. Application Data, change "May 7, 1995" to -- May 7, 1999 --.

Signed and Sealed this

Twenty-seventh Day of May, 2003

JAMES E. ROGAN
*Director of the United States Patent and Trademark Office*